US012747711B2

(12) United States Patent
Rodatz et al.

(10) Patent No.: US 12,747,711 B2
(45) Date of Patent: Sep. 29, 2026

(54) APPARATUS AND METHOD FOR LAMBDA CONTROL OF SPARK-IGNITION ENGINES, AND MOTOR VEHICLE

(71) Applicant: Schaeffler Technologies AG & Co. KG, Herzogenaurach (DE)

(72) Inventors: Paul Rodatz, Munich (DE); Gerhard Haft, Munich (DE); Florian Pickl, Beilngries (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 18/838,506

(22) PCT Filed: Feb. 7, 2023

(86) PCT No.: PCT/EP2023/052938
§ 371 (c)(1),
(2) Date: Aug. 14, 2024

(87) PCT Pub. No.: WO2023/156252
PCT Pub. Date: Aug. 24, 2023

(65) Prior Publication Data

US 2025/0163864 A1 May 22, 2025

(30) Foreign Application Priority Data

Feb. 15, 2022 (DE) ..................... 10 2022 103 558.1

(51) Int. Cl.
*F02D 41/14* (2006.01)
*F01N 3/021* (2006.01)
(Continued)

(52) U.S. Cl.
CPC ......... *F02D 41/1454* (2013.01); *F01N 3/021* (2013.01); *F01N 3/101* (2013.01);
(Continued)

(58) Field of Classification Search
CPC ...... F02D 41/1454; F01N 3/021; F01N 3/101; F01N 3/105; F01N 3/20
See application file for complete search history.

(56) References Cited

U.S. PATENT DOCUMENTS 6,256,983 B1 * 7/2001 Yasui .................. F02D 41/1441 60/276
9,151,206 B2 * 10/2015 Van Nieuwstadt ..... F01N 3/101
(Continued)

FOREIGN PATENT DOCUMENTS

DE 10239258 A1 3/2004
DE 102014204682 A1 10/2015
(Continued)

OTHER PUBLICATIONS

International Search Report for Application No. PCT/EP2023/052938, dated Jun. 6, 2023, 2 pages, English translation.
(Continued)

*Primary Examiner* — Matthew T Largi
(74) *Attorney, Agent, or Firm* — CANTOR COLBURN LLP

(57) ABSTRACT

A device for lambda control of a gasoline engine includes a first three-way catalytic converter, a second three-way catalytic converter, a linear lambda sensor, a binary lambda sensor and an NOx sensor. The first three-way catalytic converter is arranged upstream of the second three-way catalytic converter. The linear lambda sensor is arranged upstream of the first three-way catalytic converter. The binary lambda sensor is arranged downstream of the first three-way catalytic converter or the binary lambda sensor is arranged in the first three-way catalytic converter or in the second three-way catalytic converter and is arranged upstream of the second three-way catalytic converter. The NOx sensor is arranged downstream of the second three-way
(Continued)

catalytic converter, and the linear lambda sensor, the binary lambda sensor and the NOx sensor are connected to a control device for lambda control.

5 Claims, 4 Drawing Sheets

(51) Int. Cl.
*F01N 3/10* (2006.01)
*F01N 9/00* (2006.01)

(52) U.S. Cl.
CPC ............... *F01N 3/105* (2013.01); *F01N 9/00* (2013.01); *F01N 2900/0408* (2013.01); *F01N 2900/0411* (2013.01); *F01N 2900/0412* (2013.01); *F01N 2900/1402* (2013.01)

(56) References Cited

U.S. PATENT DOCUMENTS

| | | | | |
|---|---|---|---|---|
| 11,085,348 | B2 * | 8/2021 | Fey | F02D 41/0295 |
| 2011/0219746 | A1 * | 9/2011 | Yezerets | F02D 41/1454 60/285 |
| 2011/0220084 | A1 * | 9/2011 | Burak | F02D 41/0255 123/703 |
| 2019/0360416 | A1 * | 11/2019 | Nee | F01N 13/009 |
| 2020/0049050 | A1 * | 2/2020 | Paukner | F01N 3/2026 |
| 2020/0284177 | A1 * | 9/2020 | Fey | F02D 41/0295 |
| 2020/0347793 | A1 * | 11/2020 | Wagner | F02D 41/1445 |
| 2020/0355130 | A1 * | 11/2020 | Magner | F02D 41/1454 |
| 2020/0361772 | A1 * | 11/2020 | Hall | A61P 11/00 |
| 2020/0408132 | A1 | 12/2020 | Lupescu et al. | |
| 2022/0316416 | A1 * | 10/2022 | Rodatz | F02D 41/1459 |

FOREIGN PATENT DOCUMENTS

| | | | |
|---|---|---|---|
| DE | 102016112657 | A1 | 1/2018 |
| DE | 102017122817 | A1 | 4/2018 |
| DE | 102017218327 | A1 | 4/2019 |
| DE | 102018206451 | A1 | 10/2019 |
| DE | 102018132466 | A1 | 6/2020 |
| DE | 102019205551 | A1 | 10/2020 |
| DE | 102019211991 | A1 | 2/2021 |
| EP | 1045124 | B1 | 12/2004 |
| EP | 1507079 | B1 | 6/2006 |

OTHER PUBLICATIONS

Motorsport Bosch. "Lambda sensors" Apr. 14, 2011, p. 1, Retrieved from the internet: https://www.bosch-motorsport.com/content/downloads/Raceparts/Resources/pdf/Basic%20Information_69090699_Lambda_Sensor_LSU_4.9.pdf.

Written Opinion for Application No. PCT/EP2023/052938, dated Jun. 6, 2023, 4 pages, English translation.

* cited by examiner

APPARATUS AND METHOD FOR LAMBDA CONTROL OF SPARK-IGNITION ENGINES, AND MOTOR VEHICLE

CROSS-REFERENCE TO RELATED APPLICATIONS

This application is a 35 U.S.C. § 371 National Stage patent application of PCT/EP2023/052938, filed on 7 Feb. 2023, which claims the benefit of German patent application 10 2022 103 558.1, filed on 15 Feb. 2022, the disclosures of which are incorporated herein by reference in their entirety.

TECHNICAL FIELD

The present disclosure relates to a device and method for lambda control of a gasoline engine and to a motor vehicle.

BACKGROUND

The requirements for exhaust emissions from vehicles powered by internal combustion engines have risen steadily in recent years. It is also to be expected that the emission limits for vehicles powered by internal combustion engines will become ever stricter in the future.

Three-way catalytic converters (TWC) are often used for exhaust gas purification in conjunction with gasoline engines. The conversion performance of such three-way catalytic converters is optimal in the so-called lambda window ($\lambda \approx 1$).

Devices and methods for exhaust gas purification are known, for example, from documents DE102014204682A1, DE102016112657A1, DE102017218327A1, DE102018206451A1, DE102019205551A1 and DE102019211991A1.

The aim of lambda or mixture control in a gasoline engine is therefore to operate the three-way catalytic converter within this lambda window. The optimum lambda is adjusted by means of a lambda sensor upstream of the catalytic converter. Fine adjustment can be carried out via a trim control—by means of a binary lambda sensor, e.g. downstream of the catalytic converter or in the catalytic converter.

For trim control, a voltage value can be assigned to the lambda window on a characteristic curve of the binary lambda sensor. This control concept is based on the assumption that there is always a correlation between this voltage value and optimum emission conversion. However, if the characteristic curve of the binary lambda sensor shifts due to cross-sensitivities, in particular due to hydrogen and/or the sensor temperature, this correlation can be broken. In this case, the trim control causes an incorrect adjustment of a setpoint value for the linear lambda sensor. The lambda window can also shift due to catalytic converter ageing. As the lambda sensor cannot measure the emissions directly, leaving the optimum conversion remains undetected and the catalytic converter is no longer operated in the lambda window. In this case, the emissions can increase unnoticed.

SUMMARY

Against this background, the present disclosure is based on the technical problem of providing a device, method and motor vehicle which do not have the disadvantages described above, or at least to a lesser extent, and in particular enable reliable and improved exhaust gas after-treatment of gasoline engines.

The technical problem described above is solved in each case by the independent claims. Further embodiments of the disclosure result from the dependent claims and the following description.

According to a first aspect, the disclosure relates to a device for lambda control of a gasoline engine, having a first three-way catalytic converter, having a second three-way catalytic converter, having a linear lambda sensor, having a binary lambda sensor and having an NOx sensor, wherein the first three-way catalytic converter is arranged upstream of the second three-way catalytic converter, wherein the linear lambda sensor is arranged upstream of the first three-way catalytic converter, wherein the binary lambda sensor is arranged downstream of the first three-way catalytic converter and upstream of the second three-way catalytic converter or wherein the binary lambda sensor is arranged in the first three-way catalytic converter or in the second three-way catalytic converter, wherein the NOx sensor is arranged downstream of the second three-way catalytic converter and wherein the linear lambda sensor, the binary lambda sensor and the NOx sensor are connected to a control device for lambda control.

The additional NOx sensor enables direct measurement of the emissions and thus a check of the effectiveness and an adjustment of the lambda control if, for example, ageing effects or a shift in a characteristic curve of the binary lambda sensor are detected on the basis of the measured emissions.

In this case, "upstream" means that an exhaust gas flow from the gasoline engine flows through a component before another component. The term "upstream" is therefore used synonymously with the terms "in front of", "preceding" or "on the engine side" with regard to the relative position of the components along the flow direction in the exhaust system. In other words, if a component is arranged "upstream" or "in front of" another component or is "precedent" to it, this component is arranged closer to the gasoline engine in relation to the exhaust gas flow than the other component, is flowed through earlier and is therefore arranged further away from an outlet of the exhaust system into the environment.

In this case, "downstream" means that an exhaust gas stream from the gasoline engine flows through the component after another component. The term "downstream" is therefore used synonymously with the terms "after", "subsequent" or "exhaust side" with regard to the relative position of the components along the flow direction in the exhaust system. This means that if a component is arranged "downstream" of or "after" another component or is "subsequent" to it, this component is arranged further away from the gasoline engine in relation to the exhaust gas flow than the other component, is flown through later and is therefore arranged closer to the outlet of the exhaust system into the environment.

If in the present case reference is made to a binary lambda sensor here, reference is made in particular to a jump sensor. In particular, the binary lambda sensor is set up to output a first value for a lean mixture and a second value for a rich mixture. "Binary" in this context means that the lambda sensor can measure the two states "rich" and "lean", e.g. can distinguish between $\lambda>1$ and $\lambda<1$, but without being able to measure the exact lambda value or oxygen content in the exhaust gas.

If in the present case reference is made to a linear lambda sensor here, reference is made in particular to a broadband sensor. The linear lambda sensor not only allows a distinction to be made between "lean" and "rich", but also accurately measures the lambda value or the oxygen content of the exhaust gas flow due to an essentially linear relationship between a measured value and the oxygen content of the exhaust gas flow. The broadband probe therefore not only measures the exact amounts in a stoichiometric point λ=1, for example, but also in the lean and rich range and can display a transition of the mixture from lean to rich or vice versa.

The control device can have a cascade control with a first controller, a second controller and a third controller, wherein the first controller is set up for mixture control using a setpoint value of the linear lambda sensor, wherein the second controller is set up for trim control of the setpoint value of the linear lambda sensor using a setpoint value of the binary lambda sensor, wherein the third controller is set up for trim control of the setpoint value of the binary lambda sensor using at least one setpoint value of the NOx sensor and/or using at least one measured value of the NOx sensor.

The NOx sensor enables direct measurement of NOx emissions and NH3 emissions.

A three-way catalytic converter produces hydrogen due to the water-gas shift reaction if the gasoline engine is operated in rich or too rich mode, which in turn reacts with the NOx from combustion to form NH3. This means that if the NOx sensor detects excessively high values for NH3 emissions, the gasoline engine is being operated too rich. In this case, the third controller can shift the setpoint value of the binary lambda sensor towards lean by means of the trim control of the setpoint value of the binary lambda sensor. Based on this shift, the second controller can use the trim control of the linear lambda sensor to shift the setpoint value of the linear lambda sensor towards lean in order to adjust the lambda control back to the optimum lambda window.

A three-way catalytic converter is no longer able to reliably convert NOx if the gasoline engine is operated in lean or too lean mode. This means that if the NOx sensor detects too high values for NOx emissions, the gasoline engine is being operated too lean. In this case, the third controller can shift the setpoint value of the binary lambda sensor towards rich by means of the trim control of the setpoint value of the binary lambda sensor. Based on this shift, the second controller can use the trim control of the linear lambda sensor to shift the setpoint value of the linear lambda sensor towards rich in order to adjust the lambda control back to the optimum lambda window.

It may be provided that the third controller influences the lambda value in the per mille range, that the second controller influences the lambda value in the percentage range and that the first controller influences the lambda value in the tenths range.

If, for example, the binary lambda sensor experiences a characteristic curve shift, this characteristic curve shift can be detected by the measured values of the NOx sensor and corrected by means of the trim control. This also applies to a shift in the characteristic curve of the linear lambda sensor.

In particular, the procedure described above, in which the third controller is a trim control for the second controller and the second controller is a trim control for the first controller, can be used to achieve a medium- to long-term correction or adaptation of a mixture center position depending on the measured emissions. The term "mixture" describes the air-fuel mixture of the gasoline engine in a known manner.

The third controller can have a measured value of the NOx sensor as an input value and a trim value of the second controller as an output value. This trim value of the second controller can, for example, be a correction factor by which a predetermined setpoint value of the second controller is multiplied in order to generate a corrected setpoint value for the second controller. Alternatively, the trim value of the second controller can be a correction value that is added to or subtracted from a predetermined setpoint value of the second controller in order to generate a corrected setpoint value for the second controller.

The second controller can have a measured value of the binary lambda sensor and the trim value of the second controller as input values and a trim value of the first controller as output value. This trim value of the first controller can, for example, be a correction factor by which a specified setpoint value of the first controller is multiplied in order to generate a corrected setpoint value for the first controller. Alternatively, the trim value of the first controller can be a correction value that is added to or subtracted from a predetermined setpoint value of the first controller in order to generate a corrected setpoint value for the first controller.

The first controller can have a measured value of the linear lambda sensor and the trim value of the first controller as input values and a fuel quantity to be injected as output value.

The lambda control described above, wherein the third controller represents a trim control for the second controller and the second controller represents a trim control for the first controller, has the advantage that precise lambda control is made possible, for example against the background of ageing effects of three-way catalytic converters. However, this lambda control is comparatively slow and less suitable for compensating for short-term effects. The variant described below enables a more rapid correction of short-term effects, such as in particular a sudden increase in emissions.

The control device can have a cascade control with a first controller, a second controller and a third controller, wherein the first controller is set up for mixture control using a setpoint value of the linear lambda sensor and wherein the third controller is set up for trim control of the setpoint value of the linear lambda sensor using a setpoint value of the NOx sensor and/or using at least one measured value of the NOx sensor.

A trim control of the NOx sensor can therefore intervene directly and without an intermediate second controller in the first control of the linear lambda sensor in order to react quickly to increased NOx emissions and/or NH3 emissions.

The third controller can have a measured value of the NOx sensor as an input value and a trim value of the first controller as an output value. This trim value of the first controller, which is generated by the third controller, can, for example, be a correction factor by which a specified setpoint value of the first controller is multiplied in order to generate a corrected setpoint value for the first controller. Alternatively, the trim value of the first controller can be a correction value that is added to or subtracted from a predetermined setpoint value of the first controller in order to generate a corrected setpoint value for the first controller.

Alternatively or additionally, it may be provided that the second controller is set up for trim control of the setpoint value of the linear lambda sensor using a setpoint value of the binary lambda sensor and the second controller has a measured value of the binary lambda sensor as an input value and a trim value of the first controller as an output value. The second controller can therefore be used for the trim control of the first controller. This trim value of the first controller, which is generated by the second controller, can, for example, be a correction factor by which a predetermined setpoint value of the first controller is multiplied in order to generate a corrected setpoint value for the first controller. Alternatively, the trim value of the first controller can be a correction value that is added to or subtracted from a predetermined setpoint value of the first controller in order to generate a corrected setpoint value for the first controller.

A setpoint/actual deviation of the second controller can be an input value of the third controller. Alternatively or additionally, a measured value of the binary lambda sensor can be an input value of the third controller.

The lambda control described above, wherein the third controller represents a trim control for the first controller, can be used to counteract short-term or short-term measured emissions and bring about a rapid shift to lean or rich.

For all embodiments described above, at least one characteristic map can be assigned to the respective third controller that has data on the relationship between NH3 emissions, NOx emissions and optimum conversion of the three-way catalytic converters.

For all the embodiments described above, at least one characteristic curve can be assigned to the respective third controller that has data on the relationship between NOx emissions and an optimum conversion of the three-way catalytic converters.

In all the embodiments described above, the respective third controller can be assigned at least one characteristic curve that has data on the relationship between NH3 emissions and optimum conversion of the three-way catalytic converters.

It applies to all embodiments described above that a binary and/or linear signal from the NOx sensor can be assigned to the third controller as an input value.

It applies to all embodiments described above that a linear signal from the NOx sensor can be assigned to the third controller as an input value.

It applies to all embodiments described above that a particulate filter can be arranged upstream of the second three-way catalytic converter and downstream of the first three-way catalytic converter, which can be coated with a catalytically active component.

It applies to all embodiments described above that no further catalytically active components are arranged downstream of the NOx sensor. In other words, the NOx sensor can be arranged downstream of all catalytically active components of the device. In this way, it can be ensured that the emissions actually released into the environment are detected by the NOx sensor.

The disclosure also relates to a method comprising the method steps of: providing a device for lambda control of a gasoline engine, having a first three-way catalytic converter, having a second three-way catalytic converter, having a linear lambda sensor, having a binary lambda sensor and having an NOx sensor, wherein the first three-way catalytic converter is arranged upstream of the second three-way catalytic converter, wherein the linear lambda sensor is arranged upstream of the first three-way catalytic converter, wherein the binary lambda sensor is arranged downstream of the first three-way catalytic converter and upstream of the second three-way catalytic converter, or wherein the binary lambda sensor is arranged in the first three-way catalytic converter or in the second three-way catalytic converter, wherein the NOx sensor is arranged downstream of the second three-way catalytic converter, and wherein the linear lambda sensor, the binary lambda sensor and the NOx sensor are connected to a control device for lambda control, wherein the control device has a cascade control with a first controller, a second controller and a third controller, wherein the first controller is set up for mixture control on the basis of a setpoint value of the linear lambda sensor, wherein the second controller is set up for trim control of the setpoint value of the linear lambda sensor using a setpoint value of the binary lambda sensor, and wherein the third controller is set up for trim control of the setpoint value of the binary lambda sensor using at least one setpoint value and/or using at least one measured value of the NOx sensor; mixture control of the gasoline engine using the setpoint value of the linear lambda sensor; trim control of the setpoint value of the linear lambda sensor using the setpoint value of the binary lambda sensor; trim control of the setpoint value of the binary lambda sensor using measured values of the NOx sensor.

Alternatively, the disclosure relates to a method comprising the method steps of: providing a device for lambda control of a gasoline engine, having a first three-way catalytic converter, having a second three-way catalytic converter, having a linear lambda sensor, having a binary lambda sensor and having an NOx sensor, wherein the first three-way catalytic converter is arranged upstream of the second three-way catalytic converter, wherein the linear lambda sensor is arranged upstream of the first three-way catalytic converter, wherein the binary lambda sensor is arranged downstream of the first three-way catalytic converter and upstream of the second three-way catalytic converter, or wherein the binary lambda sensor is arranged in the first three-way catalytic converter or in the second three-way catalytic converter, wherein the NOx sensor is arranged downstream of the second three-way catalytic converter, and wherein the linear lambda sensor, the binary lambda sensor and the NOx sensor are connected to a control device for lambda control, wherein the control device has a cascade control with a first controller, a second controller and a third controller, wherein the first controller is set up for mixture control using a setpoint value of the linear lambda sensor, wherein the third controller is set up for trim control of the setpoint value of the linear lambda sensor using at least one setpoint value and/or using at least one measured value of the NOx sensor; mixture control using the setpoint value of the linear lambda sensor, with a trim control of the setpoint value of the linear lambda sensor using measured values of the NOx sensor and/or a trim control of the setpoint value of the linear lambda sensor using a setpoint value of the binary lambda sensor.

The disclosure further relates to a motor vehicle having a gasoline engine and having a device according to the disclosure and/or set up for carrying out the method according to the disclosure.

BRIEF DESCRIPTION OF THE DRAWINGS

The disclosure is described in more detail below with reference to a drawing illustrating exemplary embodiments. It shows schematically in each case.

DETAILED DESCRIPTION OF THE DRAWINGS

Figure 1:
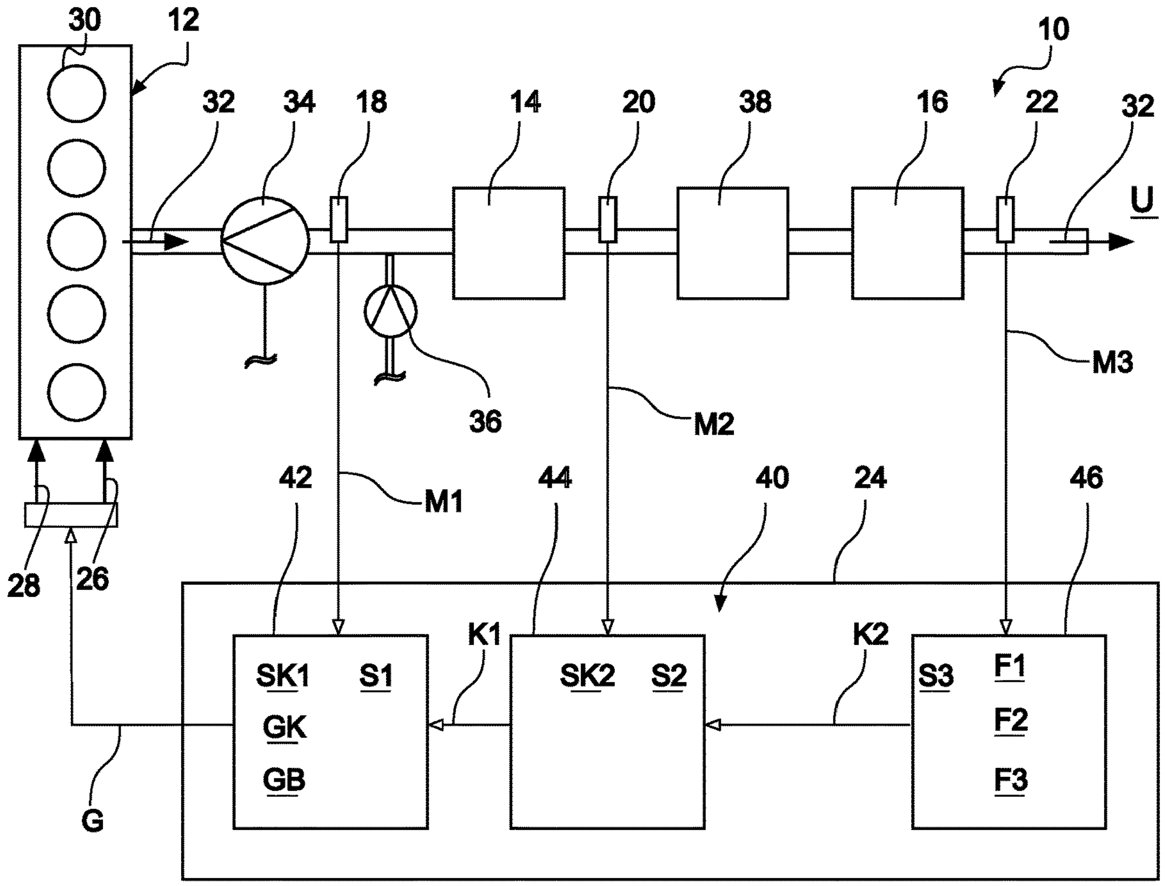
FIG. 1 shows a first device according to the disclosure.

FIG. 1 shows a first device 10 according to the disclosure for lambda control of a gasoline engine 12. The first device 10 has a first three-way catalytic converter 14, a second three-way catalytic converter 16, a linear lambda sensor 18, a binary lambda sensor 20 and an NOx sensor 22.

The first three-way catalytic converter 14 is arranged upstream of the second three-way catalytic converter 16. The linear lambda sensor 18 is arranged upstream of the first three-way catalytic converter 14. The binary lambda sensor 20 is arranged downstream of the first three-way catalytic converter 14 and upstream of the second three-way catalytic converter 16. According to alternative exemplary embodiments, the binary lambda sensor can be arranged in the first three-way catalytic converter or in the second three-way catalytic converter 16. The NOx sensor 22 is arranged downstream of the second three-way catalytic converter 16. The linear lambda sensor 18, the binary lambda sensor 20 and the NOx sensor 22 are connected to a control device 24 for lambda control.

A mixture of air 26 and fuel 28 is fed to the gasoline engine 12 in a known manner and burned in cylinders 30 of the gasoline engine 12 to generate drive power. Exhaust gas 32 flowing out of the cylinders 30 is subjected to exhaust gas aftertreatment by means of the three-way catalytic converters 14 and 16 and then discharged into an environment U. A direction of flow of the exhaust gas 32 is indicated by the direction of the arrows designated by the reference sign 32.

Further components 34, 36 can be arranged upstream and downstream of the linear lambda sensor 18 in the exhaust system. The component 34 can, for example, be a turbine of an exhaust gas turbocharger. The component 36 can be, for example, a turbine of a further exhaust gas turbocharger or an exhaust gas recirculation system.

A particulate filter 38 coated with a catalytically active component is arranged upstream of the second three-way catalytic converter 16 and downstream of the binary lambda sensor 20.

The first three-way catalytic converter 14 is an electrically heatable catalytic converter 14.

The control device 24 has a cascade control 40, having a first controller 42, a second controller 44 and a third controller 46.

The first controller 42 is set up for mixture control using a setpoint value S1 of the linear lambda sensor 18. The second controller 44 is set up for the trim control of the setpoint value S1 of the linear lambda sensor 18 using a setpoint value S2 of the binary lambda sensor 20. The third controller 46 is set up for the trim control of the setpoint value S2 of the binary lambda sensor 20 using at least one setpoint value S3 of the NOx sensor 22.

The third controller 46 has a measured value M3 of the NOx sensor 42 as an input value and a trim value K2 of the second controller 44 as an output value. The second controller 44 has a measured value M2 of the binary lambda sensor 20 and the trim value K2 of the second controller 44 as input values and a trim value K1 of the first controller 42 as output value. The first controller 42 has a measured value M1 of the linear lambda sensor 18 and the trim value K1 of the first controller 42 as input values and a fuel quantity G to be injected as output value.

The trim value K2 is offset against the setpoint value S2 of the second controller 44 to form a corrected setpoint value SK2. For example, the setpoint value S2 can be increased or decreased by the amount of the trim value K2. Alternatively, the trim value K2 can represent a correction factor and can be multiplied by the setpoint value S2 to form the corrected setpoint value SK2. Similarly, the trim value K1 is offset against the setpoint value S1 of the first controller 42 to form a corrected setpoint value SK1.

Figure 2:
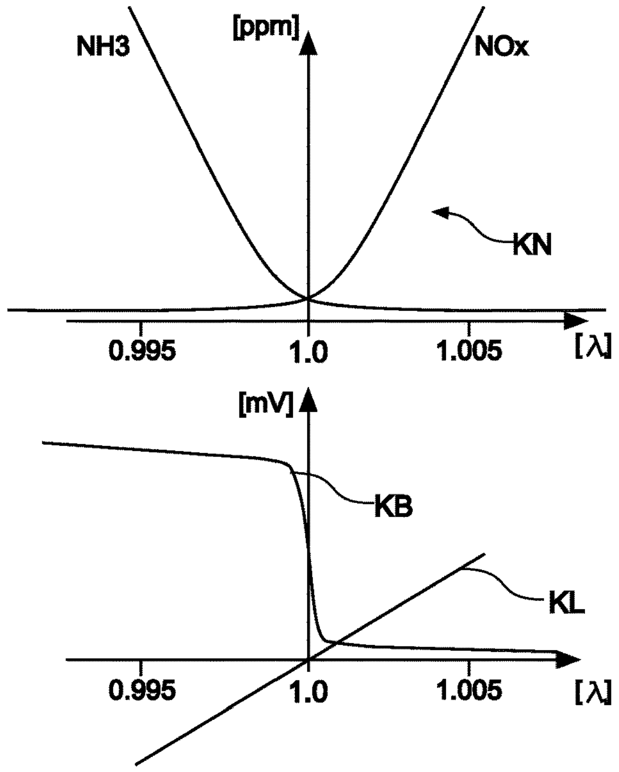
FIG. 2 shows characteristic curves of the linear and binary lambda sensor and the NOx sensor.

FIG. 2 schematically shows a characteristic curve KB of the binary lambda sensor 20, a characteristic curve KL of the linear lambda sensor 18, and a characteristic map KN for the NOx and NH3 emissions, each plotted against the lambda value. According to the known definition, a stoichiometric combustion air ratio $\lambda=1.0$ applies.

The NH3 and NOx emissions are measured in ppm (parts per million), for example, and the lambda sensors 18, 20 output measured values in mV (millivolts). It is understood that the NH3 and NOx emissions can also be indicated in milligrams per kilometer or in another standardized or cumulative manner or represented in characteristic diagrams.

If a lambda of exactly 1.0, for example, is to be adjusted in the present case, the measured NH3 and NOx emissions can be used to determine whether the gasoline engine 12 is actually being operated at lambda equal to 1.0. This is because the NH3 and NOx emissions have a minimum at lambda equal to 1.0, so that an excessively high NOx emission indicates that the gasoline engine 12 is operating too leanly and an excessively high NH3 emission indicates that the gasoline engine 12 is operating too richly.

For example, it can happen that the characteristic curve KB of the binary lambda sensor 20 changes over the course of the operating time, so that a setpoint value S2 originally specified correctly for lambda equal to 1.0, which is specified in millivolts, now causes an incorrect trim control of the first controller 42 away from lambda equal to 1.0. Based on the measurement of the NH3 and NOx emissions, the incorrect setpoint value S2 due to the shift in the characteristic curve can be corrected by means of the correction value K2, so that the corrected setpoint value SK2 again results in correct trim control of the first controller 42 by the second controller 44 for lambda equal to 1.0.

The third controller 46 can therefore be assigned characteristic curves and/or characteristic maps F1, F2 and F3, which contain data on the relationship between NH3 emission, NOx emission and an optimum conversion of the three-way catalytic converters 14, 16. Using the measured NH3 and NOx emissions, the trim value K2 can be determined using the characteristic curves and/or maps F1, F2 and F3.

For example, emission values NOx [mg/km] and NH3 [mg/km] can be evaluated according to the first characteristic map F1. For example, emission values NOx [ppm] and NH3 [ppm] can be evaluated according to the second characteristic curve F2. For example, a binary signal from the NOx sensor can be taken into account according to the characteristic curve F3. Alternatively or additionally, a linear signal from the NOx sensor can be taken into account.

No other catalytically active components are arranged downstream of the NOx sensor 22, so that the NOx sensor 22 can be used to measure the emissions actually released into the environment U and the exhaust gas aftertreatment can thus be optimally controlled.

The fuel quantity G to be injected is calculated on the basis of a basic fuel quantity GB, wherein a factor GK for adjusting the fuel quantity GB is calculated using a deviation of the measured value M1 from the corrected setpoint value SK1.

Figure 3:
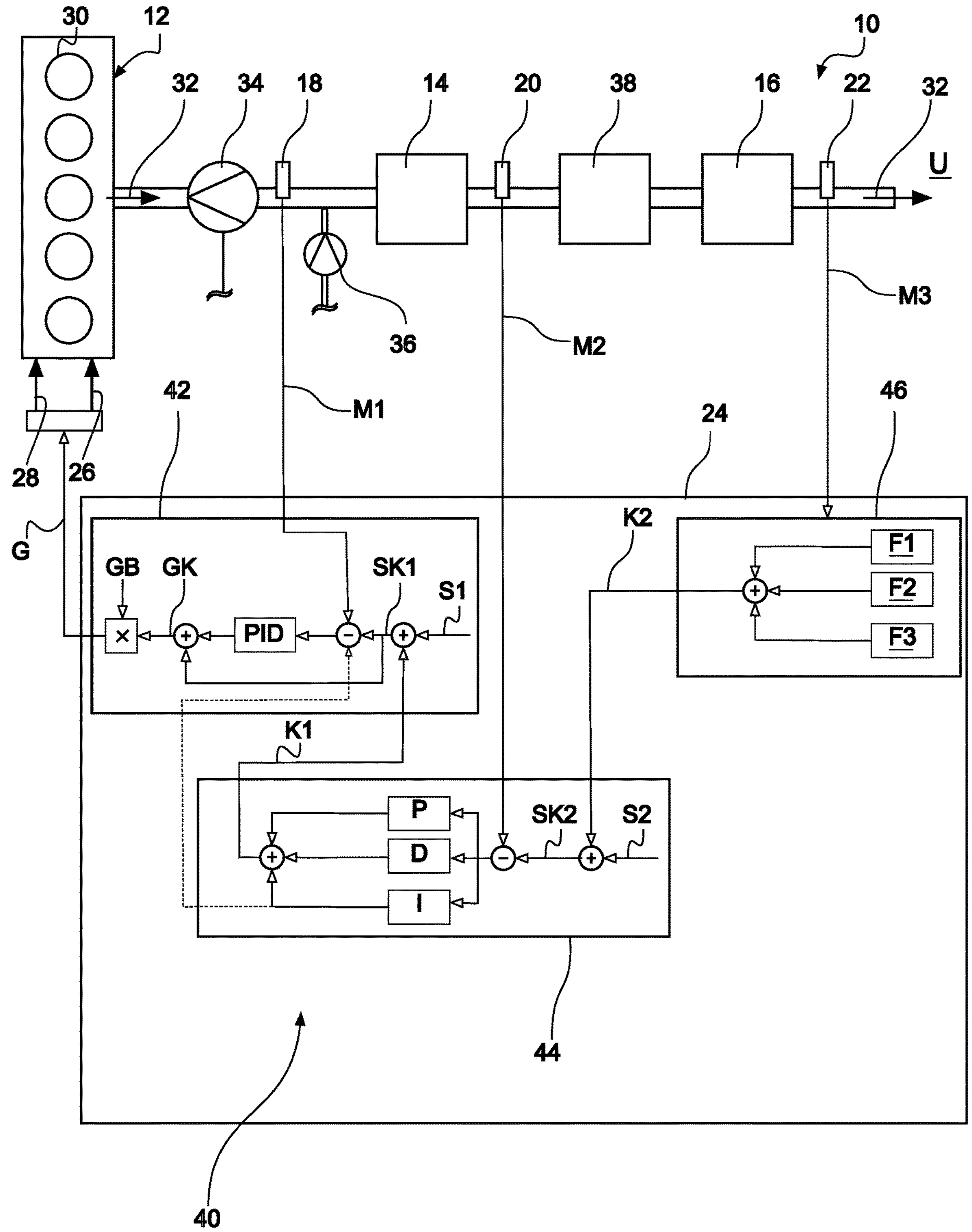
FIG. 3 shows a further illustration of the first device according to the disclosure.

FIG. 3 shows a more detailed representation of the cascade control 40. The third controller 46 can evaluate measured values M3 of the NOx sensor using one, two or more characteristic maps F1 and/or F2 and/or F3 in order to detect operation that is too lean or too rich outside the specified lambda window and generate the trim value K2.

By means of the first and second controllers 42, 44, the first correction value K1 and the fuel quantity G to be injected can subsequently be generated, in which PID elements are used.

Figure 4:
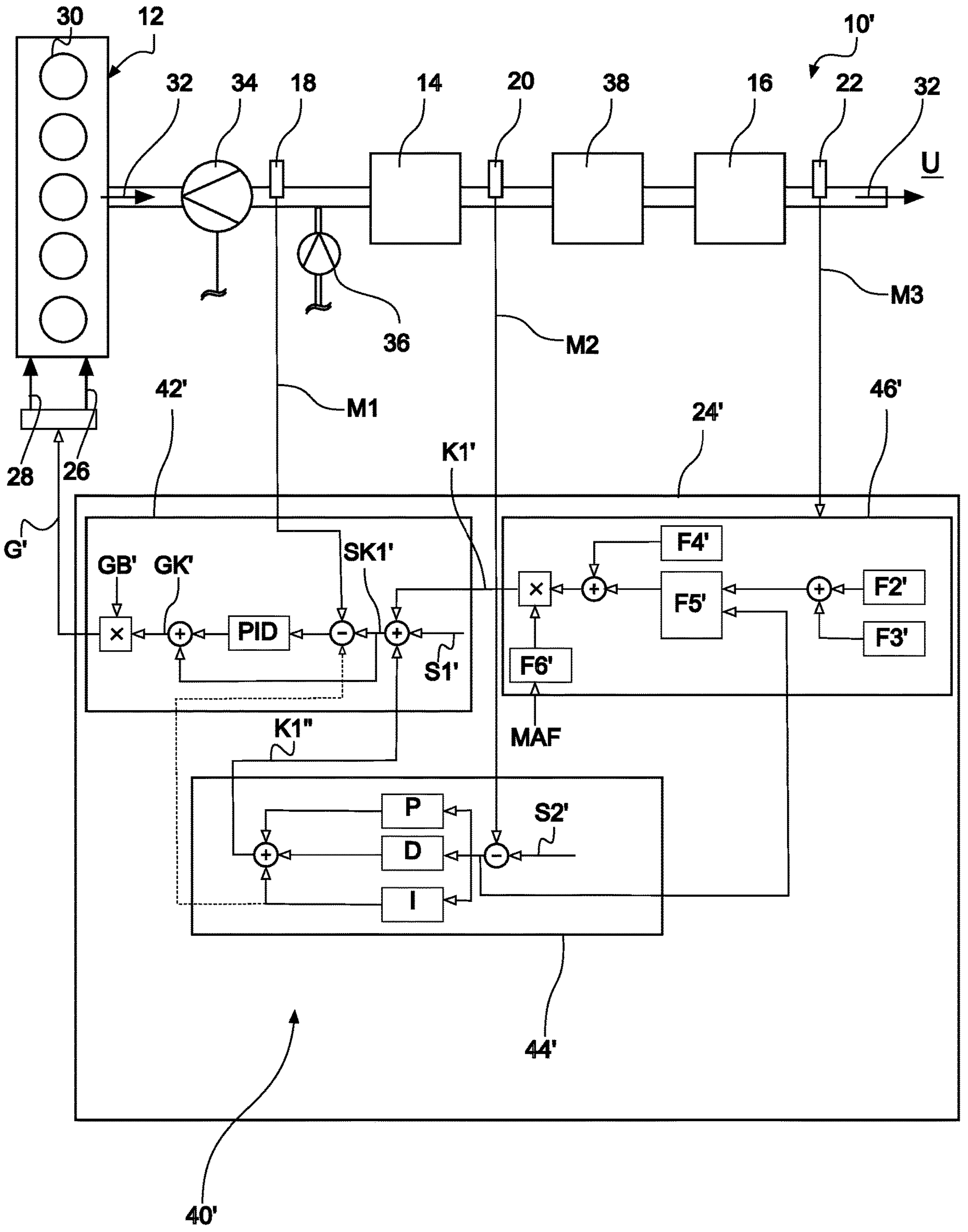
FIG. 4 shows a second device according to the disclosure.

FIG. 4 shows a second device 10' according to the disclosure, wherein only the differences to the exemplary embodiment described above are discussed and the same reference signs are assigned to the same features.

The device 10' is distinguished by a cascade control 40' of a control device 24', which differs from the exemplary embodiment described above.

The cascade control 40' has a first controller 42', a second controller 44' and a third controller 46'.

The first controller 42' is set up for mixture control using a setpoint value S1' of the linear lambda sensor 18. The third controller 46' is set up for the trim control of the setpoint value S1' of the linear lambda sensor 18. The second controller 44' can also be set up for the trim control of the setpoint value S1' of the linear lambda sensor 18.

The third controller 46' has a measured value M3 of the NOx sensor as an input value and a trim value K1' of the first controller 42 as an output value. The second controller 44' can also have a measured value M2 of the binary lambda sensor as an input value and a trim value K" of the first controller 42' as an output value.

It is provided that NOx and NH3 emissions measured by the NOx sensor are evaluated using characteristic maps and/or characteristic curves F2', F3', F4', F5', which are assigned to the third controller 46'. A measured air mass flow MAF can be evaluated using a characteristic curve F6'.

For example, emission values NOx [ppm] and NH3 [ppm] can be evaluated according to the characteristic maps F2' and F4'. For example, a binary signal from the NOx sensor can be taken into account in accordance with characteristic curve F3. Alternatively or additionally, a linear signal from the NOx sensor can be taken into account. Furthermore, a setpoint/actual deviation of the second controller 44' can be assigned to the third controller 46' as an input value.

The third controller 46' therefore has a measured value M3 of the NOx sensor 42, the measured air mass flow and the setpoint/actual deviation of the second controller 44' as input values and the trim value K1' of the first controller 42' as output value.

The second controller 44' has a measured value M2 of the binary lambda sensor 20 as an input value and the trim value K1" of the first controller 42 as an output value.

The first controller 42' has a measured value M1 of the linear lambda sensor 18 and the trim values K1', K1" of the first controller 42' as input values and a fuel quantity G' to be injected as output value, wherein K1" is optional.

The trim values K1' and K1" are offset against the setpoint value S1' of the first controller 42' to form a corrected setpoint value SK1', wherein K1" is optional.

The fuel quantity G' to be injected is calculated on the basis of a basic fuel quantity GB', wherein a factor GK' for adjusting the fuel quantity GB' is calculated on the basis of a deviation of the measured value M1 from the corrected setpoint value SK1'.

Compared to device 10, device 10' enables more rapid correction of the lambda control in the event of a sudden increase in the emissions measured by the NOx sensor.

A method for lambda control of the gasoline engine 12 by means of the device 10 has the following method steps: (A) provision of the device 10; (B) mixture control of the gasoline engine 12 using the setpoint value S1 of the linear lambda sensor 18, trim control of the setpoint value S1 of the linear lambda sensor 18 using the setpoint value S2 of the binary lambda sensor 20 and trim control of the setpoint value S2 of the binary lambda sensor using measured values or using at least one setpoint of the NOx sensor 22 (FIG. 5).

A method for lambda control of the gasoline engine 12 by means of the device 10' has the following method steps: (A') provision of a device 10'; (B)' mixture control using the setpoint value S1' of the linear lambda sensor 18, with a trim control of the setpoint value S1' of the linear lambda sensor 18 using measured values or using at least one setpoint value of the NOx sensor 22 and/or a trim control of the setpoint value S1' of the linear lambda sensor 18 on the basis of a setpoint value of the binary lambda sensor 20 (FIG. 6).

Figure 5:
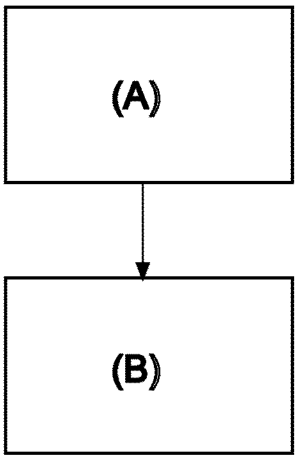
FIG. 5 shows method steps of a first method according to the disclosure.
Figure 6:
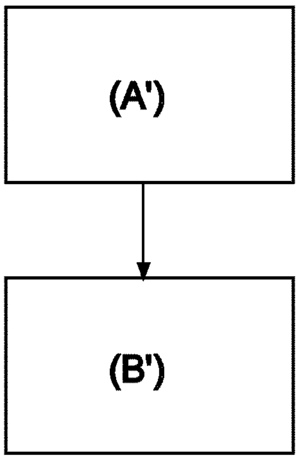
FIG. 6 shows method steps of a second method according to the disclosure.
Figure 7:
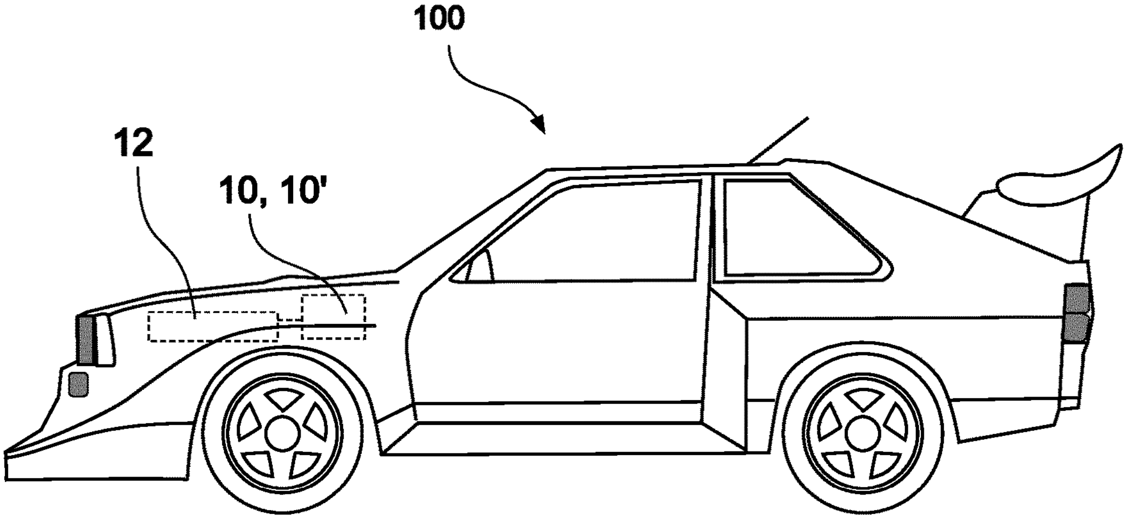
FIG. 7 shows a motor vehicle according to the disclosure.

FIG. 7 shows a motor vehicle 100 with a gasoline engine 12 and with a device 10 and/or 10', set up to carry out the methods according to FIG. 5 and/or FIG. 6.

The invention claimed is:

1. A device for lambda control of a gasoline engine, the device comprising:

a first three-way catalytic converter, a second three-way catalytic converter, a linear lambda sensor, a binary lambda sensor, wherein the binary lambda sensor is a jump sensor configured to measure two states rich and lean without being configured to measure an exact lambda value or oxygen content in an exhaust gas, and an NOx sensor, wherein the first three-way catalytic converter is arranged upstream of the second three-way catalytic converter, wherein the linear lambda sensor is arranged upstream of the first three-way catalytic converter, wherein the binary lambda sensor is arranged downstream of the first three-way catalytic converter and upstream of the second three-way catalytic converter, or wherein the binary lambda sensor is arranged in the first three-way catalytic converter or in the second three-way catalytic converter, wherein the NOx sensor is arranged downstream of the second three-way catalytic converter and wherein the linear lambda sensor, the binary lambda sensor and the NOx sensor are connected to a control device for lambda control wherein the control device has a cascade control with a first controller, a second controller and a third controller, wherein the first controller is set up for mixture control using a setpoint value of the linear lambda sensor, wherein the second controller is set up for trim control of the setpoint value of the linear lambda sensor using a setpoint value of the binary lambda sensor, and wherein the third controller is set up for trim control of the setpoint value of the binary lambda sensor using at least one setpoint value and/or using at least one measured value of the NOx sensor, wherein the third controller has a measured value of the NOx sensor as an input value and a trim value of the second controller as an output value, the second controller has a measured value of the binary lambda sensor and the trim value of the second controller as input values and a trim value of the first controller as an output value, and the first controller has a measured value of the linear lambda sensor and the trim value of the first controller as input values and a fuel quantity to be injected as output value and wherein the trim value of the second controller is offset against the setpoint value of the second controller to form a corrected setpoint value of the second controller and wherein the trim value of the first controller is offset against the setpoint value of the first controller to form a corrected setpoint value of the first controller.

2. The device according to claim 1, wherein the third controller is assigned at least one characteristic map which has data on the relationship between NH3 emission, NOx emission and optimum conversion of the three-way catalytic converters, and/or the third controller is assigned at least one characteristic curve which has data on the relationship between NH3 emission and an optimum conversion of the three-way catalytic converters, and/or the third controller is assigned at least one characteristic curve which has data on the relationship between NOx emission and optimum conversion of the three-way catalytic converters, and/or a binary and/or linear signal from the NOx sensor is assigned to the third controller as an input value.

3. The device according to claim 1, wherein a particulate filter is arranged upstream of the second three-way catalytic converter and downstream of the first three-way catalytic converter, which is coated with a catalytically active component and/or no further catalytically active components are arranged downstream of the NOx sensor.

4. A device for lambda control of a gasoline engine, the device comprising:

a first three-way catalytic converter a second three-way catalytic converter, a linear lambda sensor, a binary lambda sensor, wherein the binary lambda sensor is a jump sensor configured to measure two states rich and lean without being configured to measure an exact lambda value or oxygen content in an exhaust gas, and an NOx sensor wherein the first three-way catalytic converter is arranged upstream of the second three-way catalytic converter, wherein the linear lambda sensor is arranged upstream of the first three-way catalytic converter, wherein the binary lambda sensor is arranged downstream of the first three-way catalytic converter and upstream of the second three-way catalytic converter, or wherein the binary lambda sensor is arranged in the first three-way catalytic converter or in the second three-way catalytic converter wherein the NOx sensor is arranged downstream of the second three-way catalytic converter and wherein the linear lambda sensor, the binary lambda sensor and the NOx sensor are connected to a control device for lambda control, wherein the control device has a cascade control with a first controller, a second controller and a third controller, wherein the first controller is set up for mixture control using a setpoint value of the linear lambda sensor, wherein the third controller is set up for trim control of the setpoint value of the linear lambda sensor using at least one setpoint value and/or using at least one measured value of the NOx sensor, wherein the third controller has a measured value of the NOx sensor as an input value and a trim value of the first controller as an output value, wherein the trim value of the first controller is offset against the setpoint value of the first controller to form a corrected setpoint value of the first controller, or wherein the second controller is set up for trim control of the setpoint value of the linear lambda sensor using a setpoint value of the binary lambda sensor and the second controller has a measured value of the binary lambda sensor as an input value and a trim value of the first controller as an output value and wherein the trim value of the first controller is offset against the setpoint value of the linear lambda sensor to form a corrected setpoint value for the first controller.

5. The device according to claim 4, wherein a setpoint/actual deviation of the second controller is an input value of the third controller and/or a measured value of the binary lambda sensor is an input value of the third controller and/or a measured value of a mass air flow is an input value of the third controller.

* * * * *